A. LUTSCHG.
EXTENSION FEEDER.
APPLICATION FILED MAY 29, 1916.
1,202,749.
Patented Oct. 24, 1916.
3 SHEETS—SHEET 1.
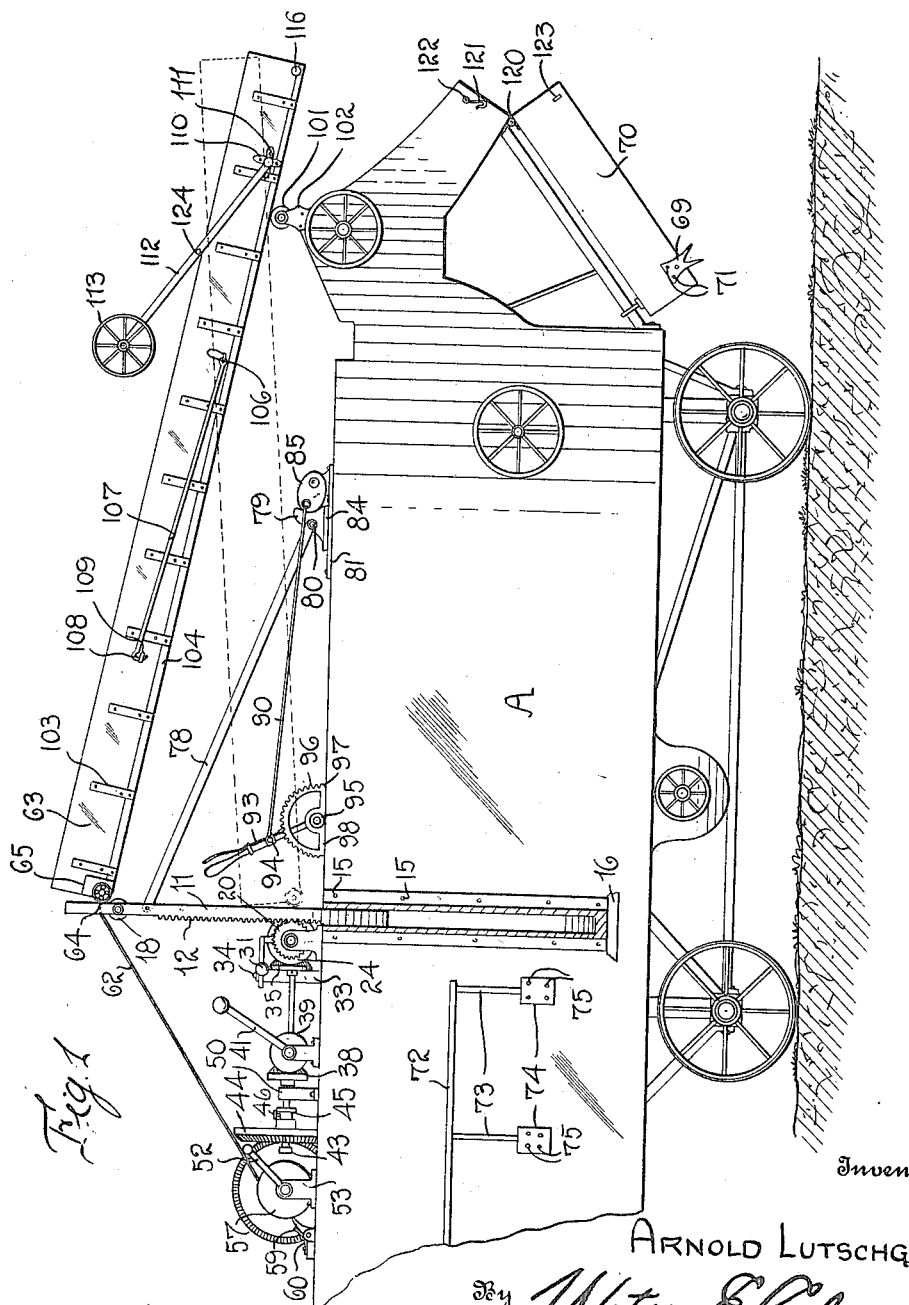
Inventor
ARNOLD LUTSCHG
By Watson E. Coleman
Attorney

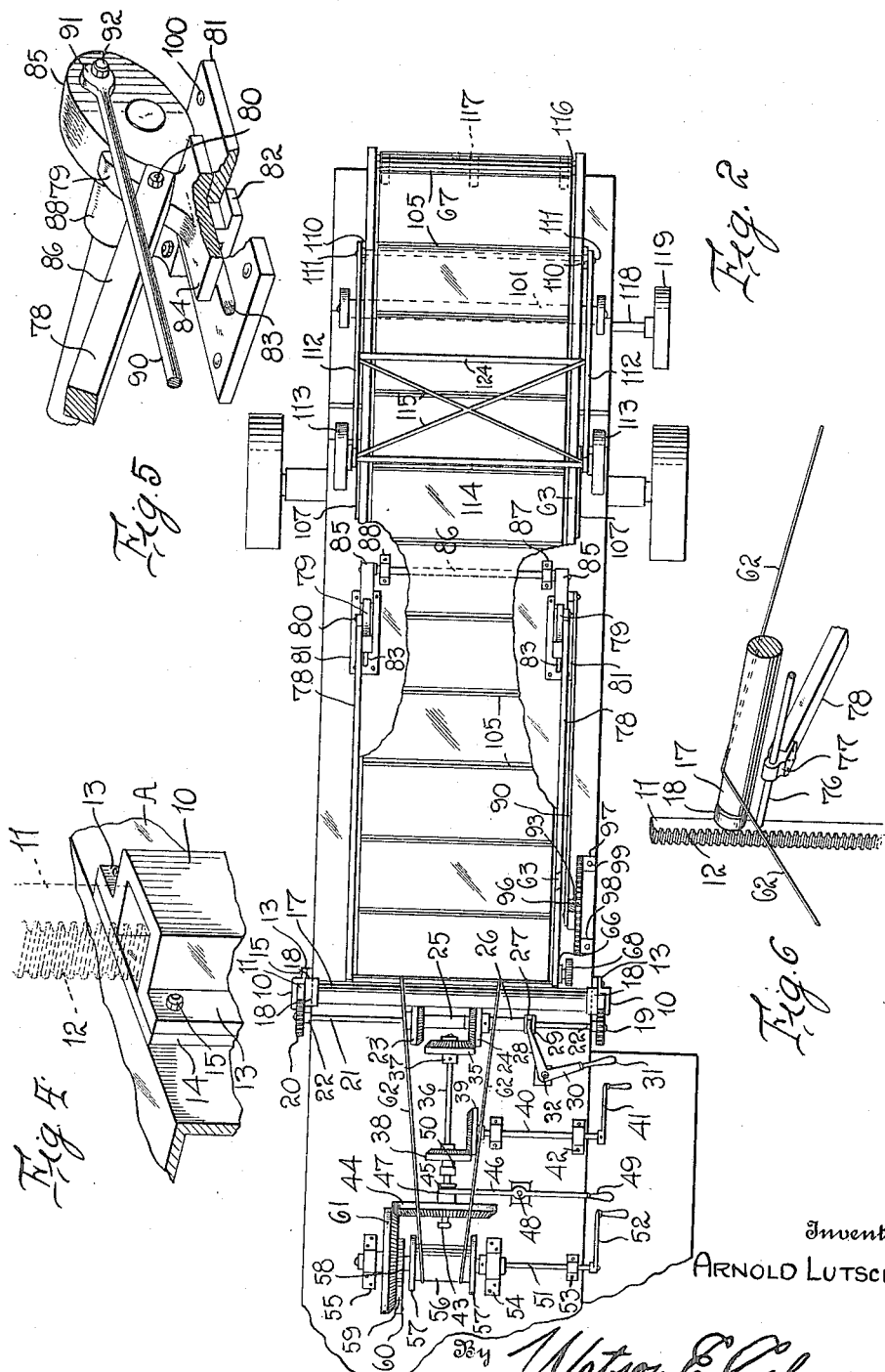

A. LUTSCHG.
EXTENSION FEEDER.
APPLICATION FILED MAY 29, 1916.
1,202,749.
Patented Oct. 24, 1916.
3 SHEETS—SHEET 3.
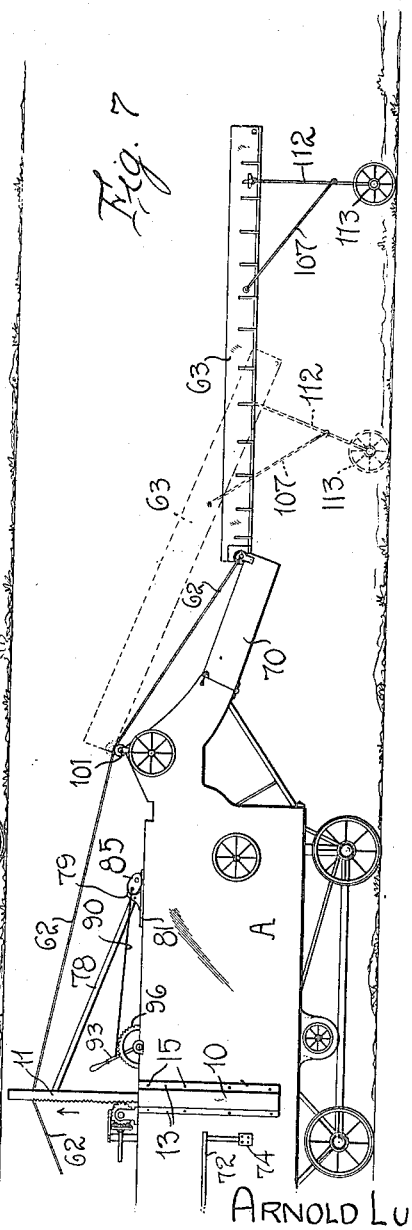
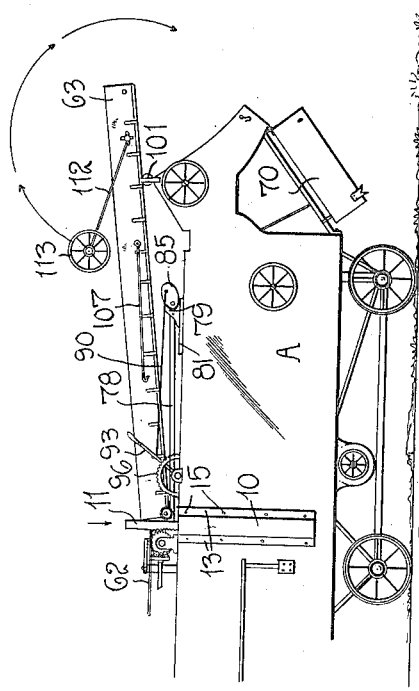
Inventor
ARNOLD LUTSCHG
By Watson E. Coleman
Attorney

UNITED STATES PATENT OFFICE.

ARNOLD LUTSCHG, OF ALVA, OKLAHOMA.

EXTENSION-FEEDER.

1,202,749.  Specification of Letters Patent.  Patented Oct. 24, 1916.

Application filed May 29, 1916. Serial No. 100,672.

*To all whom it may concern:*

Be it known that I, ARNOLD LUTSCHG, a citizen of the United States, residing at Alva, in the county of Woods and State of Oklahoma, have invented certain new and useful Improvements in Extension - Feeders, of which the following is a specification, reference being had to the accompanying drawings.

This invention is an extension feeder more particularly adapted for use in conjunction with threshing machines.

One object of this invention is to provide an extension feeder for threshing machines that may be readily and easily moved to a plurality of positions.

Another object is to provide an extension feeder in which the raising and lowering of one end may be affected without longitudinal movement, if desired.

A further object is to provide an extension feeder with means by which the feeder may be locked in a plurality of positions independently of the raising and lowering mechanism.

A still further object is to provide an extension feeder that may be carried on top of a threshing machine in a compact manner which may be quickly positioned and connected to the feeder end of a threshing machine.

One practical method of constructing the feeder is disclosed in the accompanying drawings, in which—

Figure 1 is a side elevation showing the chute in its raised position on a threshing machine; Fig. 2 is a top plan view; Fig. 3 is a side elevation showing the chute in its operative position; Fig. 4 is a perspective view showing a part of the rack and its housing; Fig. 5 is a perspective view of one of the cam elements and its engaging member, with a part of its connecting members; Fig. 6 is a perspective view of a portion of the ball bearing roller positioned near the upper ends of the rack bearing members; Fig. 7 is a side elevation showing the chute in a lowered position on top of a threshing machine and also indicates the path taken by the outer end supporting wheels.

The threshing machine indicated by the letter A has positioned on its top the several devices necessary to operate the extension feeder. Upon each side of the threshing machine A, are positioned suitable housings 10. These housings are arranged in a vertical plane and are so formed as to inclose the vertical members 11 each having a rack 12 formed upon one face. Positioned between the flanges 13 of the housing is a wear plate 14. One of the flat sides of the rack member 11 is thus adapted to bear against this wear plate.

The housing 10 is preferably U-shaped in cross section so that the flanges 13 extend outward from the upper portion of the U. The boxings or housings may be secured to the sides of the threshing machine A in any well known conventional manner, one means being shown by the screws 15. The housing extends downward from the top of the threshing machine A a sufficient distance so that it will accommodate the rack member 11 when it is in its lowered position. The bottom end of this housing may be closed by a suitable plate shown at 16.

Near the upper end of the rack members 11, there is positioned a roller 17. To engage with the rack are suitable gear wheels 19 and 20 which are mounted upon a shaft 21. This shaft is carried in bearings. On this shaft are the two miter gears 23 and 24. These gears are spaced apart and are mounted upon a sleeve 25 splined to the shaft 21. Projecting from this sleeve, as an extension thereof, is another sleeve 26 which is provided at its outer end with a collar 27. Coöperating with this collar is a lever projected at 32 and having an arm 28 carrying a yoke 29 to engage with the collar 27 and an arm 30 terminating in a handle 31. The lever is mounted on the post 33 as by means of a bolt 34.

The gears 23 and 24, by means of the sleeve 25 may be slid or moved on the shaft 21 by means of the handle 31. Thus the gears may be positioned at different points transversely of the threshing machine. As these gears are splined on the shaft, they will rotate with the shaft 21. To coöperate with either one of the gears 23 or 24 is another miter gear 35 mounted on a shaft 36. This shaft is mounted in a bearing 37. Intermediate of the length of the shaft 36 is another miter gear 38 which gear 38 meshes or engages with a miter gear 39 on a shaft 40. This shaft 40 has a crank 41 secured to its outer end and rotates within suitable bearings 42. This shaft 40 carrying the gear 39 and the handle 41 may be rotated or it may be slid through the bearings so that the gear 39 may be disengaged from the gear 38.

The shaft 36 is continued past the gear 38 and has a suitable stop projection or member 43 mounted upon the end. Adjacent this end is a miter gear 44 which is provided with a grooved collar 45 and is splined upon the shaft 36. The lever 46 carries at its outer end a yoke 47 which engages with the groove formed in the collar 45. This lever 46 is fulcrumed at 48 and the lever 46 is continued outward so as to provide a handle 49, as shown. To support this shaft 36, a bearing 50 is provided.

Positioned transversely of the threshing machine A, is a shaft 51 which terminates in a crank handle 52 at one end. This shaft 51 is carried in suitable bearings indicated at 53, 54 and 55. Mounted between the bearings 54 and 55 is a winding drum 56 which is provided at one end with suitable flanges 57 and adjacent one end or flange is a ratchet wheel 58. To engage with this ratchet wheel and hold it from turning in one direction, there is provided a pawl 59 having a spring 60. Adjacent this ratchet wheel 58 is a gear 61 which is adapted to mesh with the gear 44. The meshing of these two gears is controlled by means of the handle 49 and the lever 46, by means of which the gear 44 is slid into and out of engagement with the gear 61. The winding drum 56, the ratchet wheel 58 and the gear 61 are adapted to be rotated by means of the crank handle 52 and thus communicate a rotary motion to the shaft 36.

The flexible elements 62 are connected in any convenient way to the drum 56. These flexible elements pass over in contact with the roller 17 which is mounted between the vertically movable members 11 and are secured to the chute 63 as by means of the eye 64. The plate 65 which is secured to one end of the chute 63 also provides a bearing for the roller 66, around which roller the conveyer belt 67 passes at one end. Mounted upon one end of this roller is a pulley 68 which is adapted to engage with the fork member 69, which is positioned upon the self-feeder 70. This fork member may be secured to the hinged member 69 in any suitable way, one means being shown by the screws 71.

Positioned upon the one side of the threshing machine A is a suitable platform 72 and supporting members 73 attached to the side of the threshing machine as indicated by the plates 74 and the holding screws 75. This platform 72 provides a suitable place on which an operator may stand to operate the several handles and levers disposed on the top of the threshing machine so that the requisite movements may be communicated to the chute 63.

Positioned below the roller 17 is a brace or tie element 76. Mounted on this tie member 76 is a bearing 77 secured to the rod 78. This connecting rod 78 is connected to slide 79 by a bolt 80. This slide 79 is coöperatively connected with a plate 81 by means of a T-headed bolt 82 operating in a slot 83 which is formed in the plate 81. The transverse portion of the T-bolt engages with the under surface of the plate 81. The base 84 of slide 79 bears on the upper surface of plate 81. By means of this slot 83 and the T-headed bolt, the cam engaging member 79 may be shifted through the length of the slot 83.

A cam 85 is secured to the shaft 86 in any convenient manner. This shaft 86 rotates in the bearings 87 and 88, as shown. Upon the opposite end of this shaft 86 there is mounted another cam 85 which coöperates with a similar slide, thus the two cams are operatively connected for engagement with the cam engaging members 79 through the connecting rods 78. The cam 85 is provided with a rod 90 which has an enlarged head 91 secured to the cam by bolt 92. This bolt 92 is spaced from the axis of the shaft 86 and the cams 85 and 89 are shown as being elliptical in shape. The other end of the rod 90 is connected to the lever 93 at a suitable point indicated at 94. This latch lever 93 is pivotally mounted, as shown at 95 and is adapted to coöperate with the quadrant 96. This quadrant may be secured to the top of the machine by means of the angle plates 97 and 98 and the screws 99.

At the rear end of the machine there is positioned another roller 101 which may be mounted with ball bearings in the bearing plates 102. This roller 101 is adapted to engage with the under surface of the chute 63 at all times and when the extension feeder is being lowered to its operative position, affords a bearing on which the under surface of the chute 63 rides.

The chute 63 may be of any convenient form or shape and may also be constructed of any suitable material and is braced by the cleats 103. The bottom of the chute indicated at 104 is preferably made smooth both upon its upper and lower surfaces. At one end opposite to the roller 66 there is a roller 116 on which the conveyer belt runs. This conveyer belt 67 may be provided with cleats 105. Mounted at some convenient point, near the lower edge of the chute 63, is a brace 107 which is pivotally mounted in an eye 106. This brace is provided at its free end with a hook 108 and to hold it in an inoperative position, a pin 109 is shown which is secured in any suitable way to one side of the chute 63. A leg 112, which carries at its outer end a suitable wheel 113, is mounted on a pivot pin 111 projecting from a base 110 which is secured near one end of the chute 63. This pivot pin 111, the supporting member 112 and the wheel 113 are duplicated upon the opposite side of the chute. The wheels 113 are connected together and mounted upon a shaft 114. To suitably brace legs 112 braces 115 are provided as shown in Fig. 2. The roller 116 may be mounted in any convenient manner for rotation and is provided at one end with a pulley 117, as shown.

Disposed below the bearing plates 102 is the usual or customary shaft 118 which carries at its outer end a pulley 119. At one end of the threshing machine there is provided the self-feeder 70 which is hinged as shown at 120. To secure this hinged self-feeder in its operative position, a hook 121 is provided and is shown secured to the machine itself, as indicated at 122. Disposed at some convenient point upon the self-feeder, is a suitable fastening means, indicated at 123 with which the hook 121 may be engaged.

Fig. 3 shows the feeder in its normal inoperative position and the vertically movable members disposed within the housing. In order to dispose the extension into the position shown in Fig. 7, the handle 31 is shifted so as to bring the gear 23 in mesh with the gear 35. The pawl 59 is released from engagement with the ratchet wheel 58, then upon turning the handle 52 in a clockwise direction, the drum 56 will unwind the flexible elements and the shaft 51 will communicate motion to the gear 44 by means of the gear 61. The gear 44 will then cause the shaft 36 to rotate and motion will be communicated to the shaft 21 by means of the gears 35 and 23. The gears 22 meshing with the pivot 12 of the rack 11 will raise the vertical members upward and, at the same time the flexible elements 62 will be slackened sufficiently to allow for this vertical movement. When the members 11 have reached their upper limit and the chute 63 is positioned for longitudinal movement toward the feeding end of the threshing machine, the lever 46 is moved so as to cause a disengagement between the gear 44 and the gear 61.

When the pawl 59 is released from engagement with the ratchet wheel 58 and the drum is turned in a clockwise direction by means of the crank handle 52, the flexible elements will then permit the chute 63 by its own weight to travel to its operative position so as to be positioned adjacent the self-feeder 70. The upward movement of the vertical members 11, by means of the tie bar 76 raises the connecting rod 78 which pulls backward the slide 79. When the members 11 have reached their upper limit, the slides 84 have been pulled backward to their extreme limit. They are then in a position to be engaged by the cams 85 which are operated by means of the rod 90 and the lever 93. The connecting rod 78 may then be locked at this position.

The roller 17 supports the flexible elements 62 as the chute 63 is moving rearward and when the feeder has been positioned in its operative relation to the self-feeder, these flexible elements rest upon the roller 101. When the chute arrives at its operative position, the legs 112 are rotated to the position shown in Fig. 7 and thus act as supports for the free end feeder. When these wheels and their supporting members are positioned beneath the conveyer, the rod 107 having the hook 108 at its ends, is disengaged from the pin 109 and the hook is engaged with a suitable pin 124 mounted upon each one of the supporting members 112. The wheels and framework will then be supported in a rigid condition relative to the chute 63.

In order to position the conveyer upon the top of the threshing machine, the reverse operations will take place. It will be seen from the plan view shown in Fig. 2, that by means of the slidable gears 23 and 24 and the slidable gear 44 the vertical members may be maintained in their vertical relation and the drum may be rotated so as to wind the flexible elements thereon without any movement of the vertical members, or if desired, the shifting of the gears will cause a simultaneous action to take place between the winding and the lowering of the vertical elements. Thus the vertical members may be raised or lowered without operating the drum winding mechanism by means of the gears 38 and 39 at which time the gear 44 is disengaged from the gear 61.

Minor changes in the form and details of construction may be resorted to without departing from the spirit of my invention or the scope of the appended claims.

Having described this invention, what is claimed is:—

1. The combination with a threshing machine, of an extension feeder including a chute and a conveyer, the feeder being normally supported above the threshing machine, vertically movable supporting members mounted upon the threshing machine, means on the threshing machine for slidably supporting the chute, and means operatively supported by said supporting means normally holding the chute in a raised position, but permitting the chute to be lowered rearward to an operative position, said means being adapted to retract the chute from its operative to its inoperative position.

2. The combination with a threshing machine, of an extension feeder including a chute normally supported upon the threshing machine, vertically movable supporting members mounted upon the threshing machine, means for vertically shifting the supporting members, a winding drum, a cable connecting the winding drum to the rear end of the chute, a roller mounted upon said vertically movable supporting members and over which the cable passes, and rollers slidably supporting the chute.

3. The combination with a threshing machine, of an extension feeder including a chute normally supported above the threshing machine, vertically movable members carried upon the threshing machine and operatively engaging with the rear end of the chute, means for raising or lowering the supporting members, braces pivotally connected to said supporting members and having operative sliding engagement with the top of the threshing machine, and adjustable means for holding said sliding members against rearward movement.

4. The combination with a threshing machine, of an extension feeder including a chute normally supported above the threshing machine, vertically movable supporting members mounted upon the threshing machine and adapted to raise the rear end of the chute or lower it, a winding drum and a cable connected to the rear end of the chute and operatively supported by said vertically movable members.

5. The combination with a threshing machine, of an extension feeder including a chute normally supported above the threshing machine, vertically movable supporting members mounted on the threshing machine, a roller supported by the upper ends of said members, a winding drum, cables passing over said winding drum and roller and engaged with the upper end of the chute, and means for simultaneously raising the supporting members and rotating the winding drum to unwind the cable therefrom in correspondence with the vertical movement of the supporting members.

6. The combination with a threshing machine, of an extension feeder including a chute normally disposed above the threshing machine, vertically movable supporting members mounted on the threshing machine, means for raising and lowering the supporting members including a shaft, a winding drum, cables passing over the supporting members from the winding drum and attached to the upper end of the chute, means for simultaneously rotating said shaft and the winding drum or independently rotating the shaft and winding drum, and means on the threshing machine for slidably supporting the chute.

7. The combination with a threshing machine, of an extension feeder including a chute normally disposed above the threshing machine, a pair of rack bars slidably mounted upon the sides of the threshing machine, a roller mounted upon and between the rack bars at the upper ends thereof, a shaft, gear wheels mounted on the shaft and engaging the rack bars, a winding drum, cables passing from said drum over said roller and engaging the forward end of the chute, means for rotating the winding drum, a shaft operatively engaged with the first named chute, but disengageable therefrom, and means for rotating the second named shaft from the winding drum.

8. The combination with a threshing machine, of rack bars slidably mounted upon the sides of the machine, a roller connecting said rack bars, braces pivotally connected to the upper ends of the rack bars and slidably connected to the threshing machine, means for holding the latter ends of the braces in adjusted positions, means for raising or lowering the rack bars, a roller mounted upon the rear end of the threshing machine, a winding drum mounted on the threshing machine, a cable passing around the winding drum and over the first named roller, a chute resting upon the second named roller and connected at its rear end to said cable, and legs pivoted to the forward end of the chute and adapted to be turned into supporting position when the chute is lowered.

In testimony whereof I hereunto affix my signature in the presence of two witnesses.

ARNOLD LUTSCHG.

Witnesses:
GEO. WEABER,
L. B. SCOTT.

Copies of this patent may be obtained for five cents each, by addressing the "Commissioner of Patents Washington, D. C."